United States Patent [19]

Schmidts et al.

[11] Patent Number: 4,552,524

[45] Date of Patent: Nov. 12, 1985

[54] HYDRAULIC PRESS

[75] Inventors: Klaus Schmidts; Dieter Therolf; Ulrich Weber, all of Dortmund, Fed. Rep. of Germany

[73] Assignee: Hoesch Aktiengesselschaft, Dortmund, Fed. Rep. of Germany

[21] Appl. No.: 687,190

[22] Filed: Dec. 28, 1984

[30] Foreign Application Priority Data

Dec. 31, 1983 [DE] Fed. Rep. of Germany ... 8337753[U]

[51] Int. Cl.[4] .......................... B29C 17/00; B29C 1/00; B30B 11/00

[52] U.S. Cl. .................................... 425/406; 425/384; 425/451.2

[58] Field of Search ............... 425/383, 384, 388, 406, 425/451.2, 590, DIG. 223, DIG. 221

[56] References Cited

U.S. PATENT DOCUMENTS

| | | | |
|---|---|---|---|
| 2,792,592 | 5/1957 | McGee | 425/406 |
| 2,812,543 | 11/1957 | Stacy | 425/406 |
| 2,820,250 | 1/1958 | Stratton | 425/406 X |
| 3,830,613 | 8/1974 | Aoki | 425/DIG. 221 X |
| 3,868,201 | 2/1975 | Jacobson et al. | 425/406 X |
| 4,043,729 | 8/1977 | Paracchi | 425/384 X |
| 4,255,113 | 3/1981 | Kurosawa et al. | 425/406 X |

*Primary Examiner*—J. Howard Flint, Jr.

*Attorney, Agent, or Firm*—McCormick, Paulding & Huber

[57] ABSTRACT

In a press an hydraulic adjusting cylinder connected to the slidable cross-piece of the press has a stroke matching the range of movement of the press and a number of hydraulic press cylinders of short stroke are provided for executing the working strokes of the press. The press cylinders are each couplable to the slidable cross-piece by a coupling including a coupling rod and a stationary clamping jaw and a pressable clamping jaw cooperating with the coupling rod, the pressable clamping jaw being activated by at least one single acting hydraulic cylinder.

6 Claims, 8 Drawing Figures

HYDRAULIC PRESS

The invention concerns an hydraulic press, such as for pressing plastic mats reinforced with glass fibers into formed parts, the press having a stationery and a slidable cross-piece as well as a press drive, which drive for driving the slidable cross-piece has at least one adjusting cylinder with a working stroke corresponding to the length of the range of movement of the slidable cross-piece and at least two press cylinders of short stroke each couplable to the slidable cross-piece through a coupling.

Two presses of the aforementioned kind are described and illustrated in German patent application No. P 33 23 931.2.

In both of these presses four press cylinders are incorporated for executing the press stroke, each of which is couplable to the slidable cross-piece through a positive coupling.

All positive couplings of the first press each contain a threaded rod and all positive couplings of the second press each contain a rod with an interrupted multiple wedge profile.

Such positive couplings allow the coupling of the press cylinders to the slidable cross-carriage in each graduation plane of the screw or the interrupted plural wedge profile.

The space between neighboring graduation planes of a single threaded screw corresponds to the thread pitch. In case of an interrupted multiple wedge profile the distance between two neighboring graduation planes is the measurement from interruption to interrruption.

These press constructions give rise to the disadvantage that the short stroke of the press cylinders cannot always be used entirely for the press stroke over the whole working range of movement of the press.

The press stroke loss in the whole working range of such a press is on the average half the spacing between two neighboring graduation planes.

The invention has as its object the provision of a press of the aforementioned type wherein the stroke of the press cylinders can be used for the press stroke throughout the entire working range of movement of the press.

In accordance with the invention this problem is solved in that for coupling each press cylinder to the slidable cross-piece a coupling rod is provided along with at least one stationery and one pressable clamping jaw.

Advantageously several pressure cylinders are arranged in superimposed relation to one another between the two pressable clamping jaws of two coupling rods.

The pressure cylinders are each made with a single acting piston.

Each pressable clamping jaw is movable perpendicular to the direction of the press stroke.

In the case of transfering a large press forces to the slidable cross-piece each coupling rod contains at least one longitudinal slot with each longitudinal slot having arranged with it at least one pressure plate. Each pressure plate is movable perpendicular to the direction of the press stroke.

In the following, the invention is described in more detail in connection with the drawings which schematically illustrate two embodiments.

The drawings are:

FIRST EMBODIMENT

Figure 1:
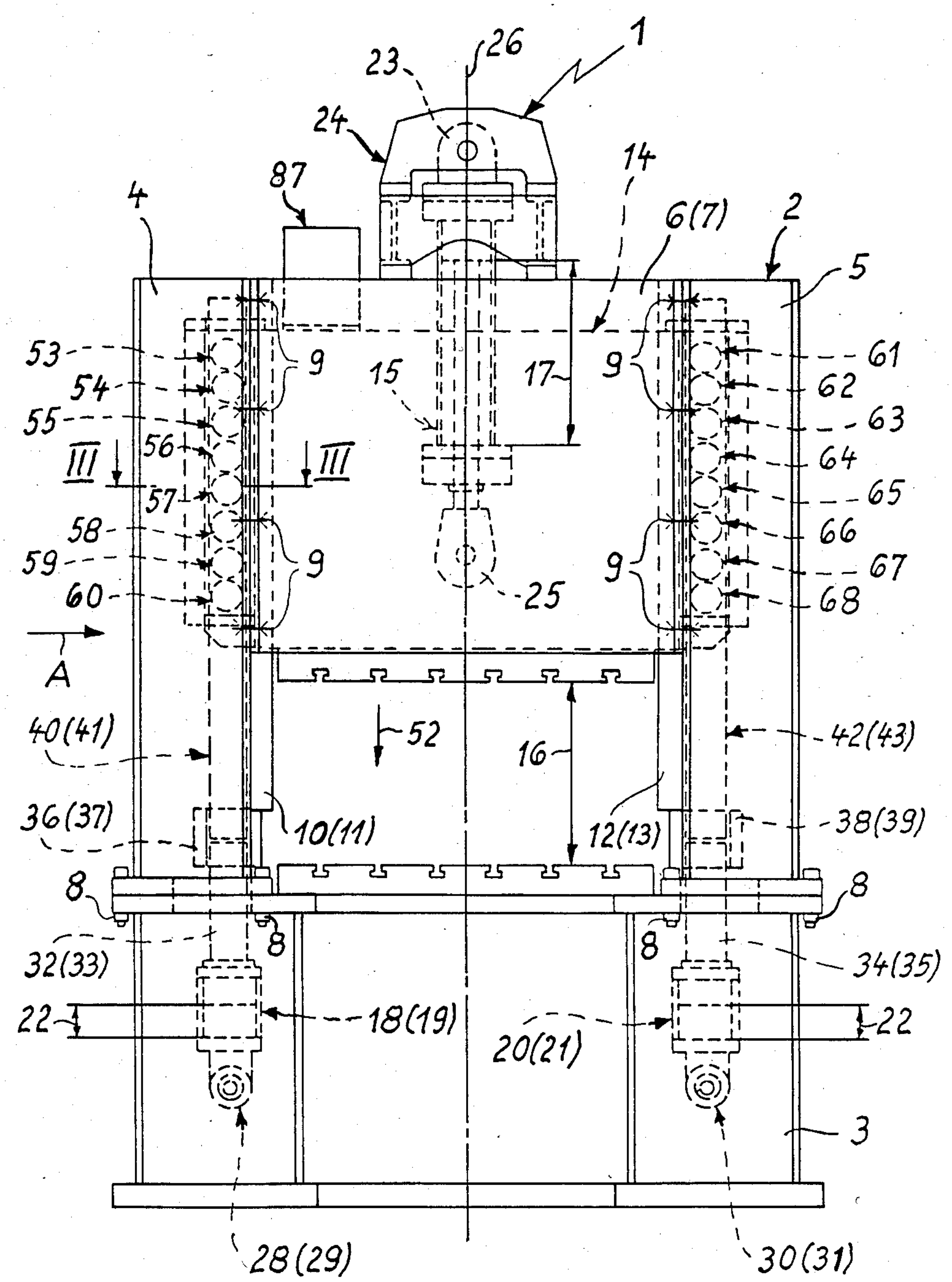
FIG. 1 is a front view of of an hydraulic press comprising a first embodiment of the invention.
Figure 2:
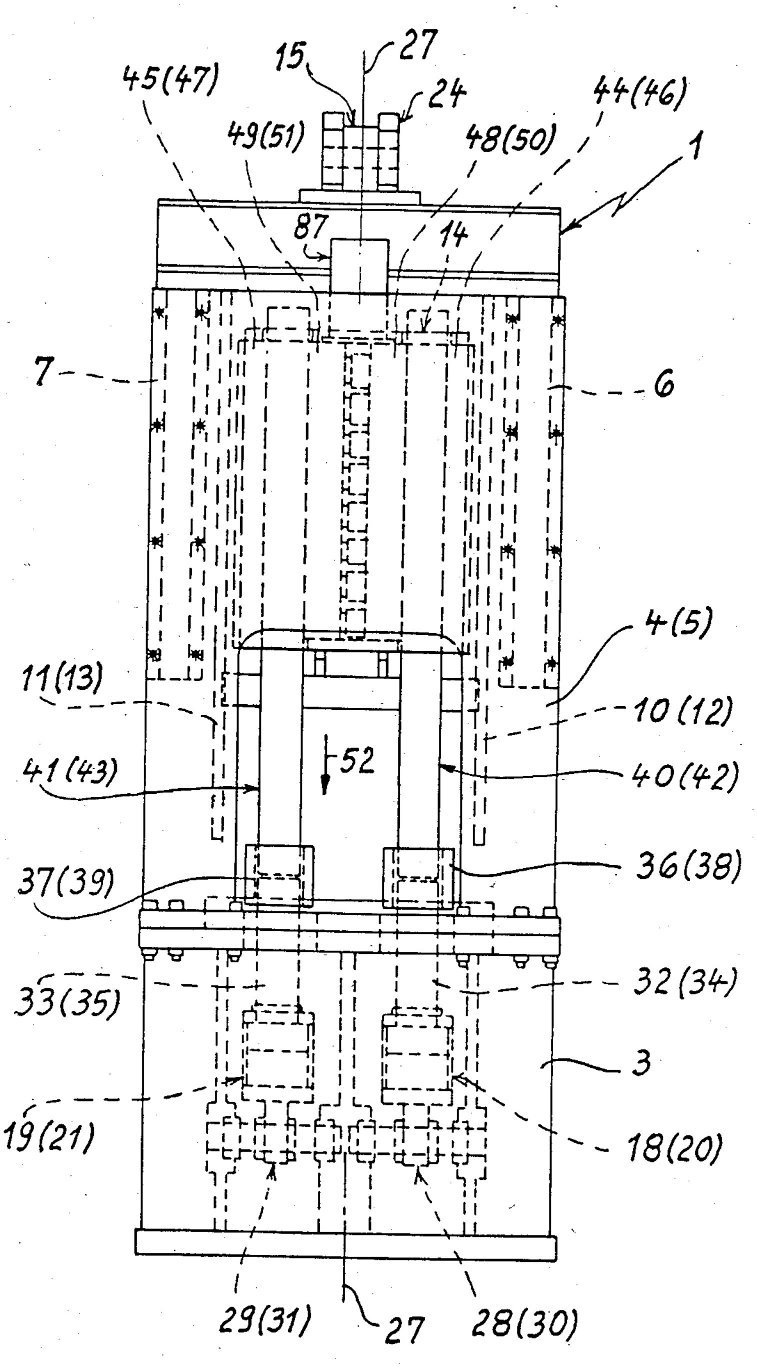
FIG. 2 is a side view of the press taken in the direction of the arrow A of FIG. 1.
Figure 3:
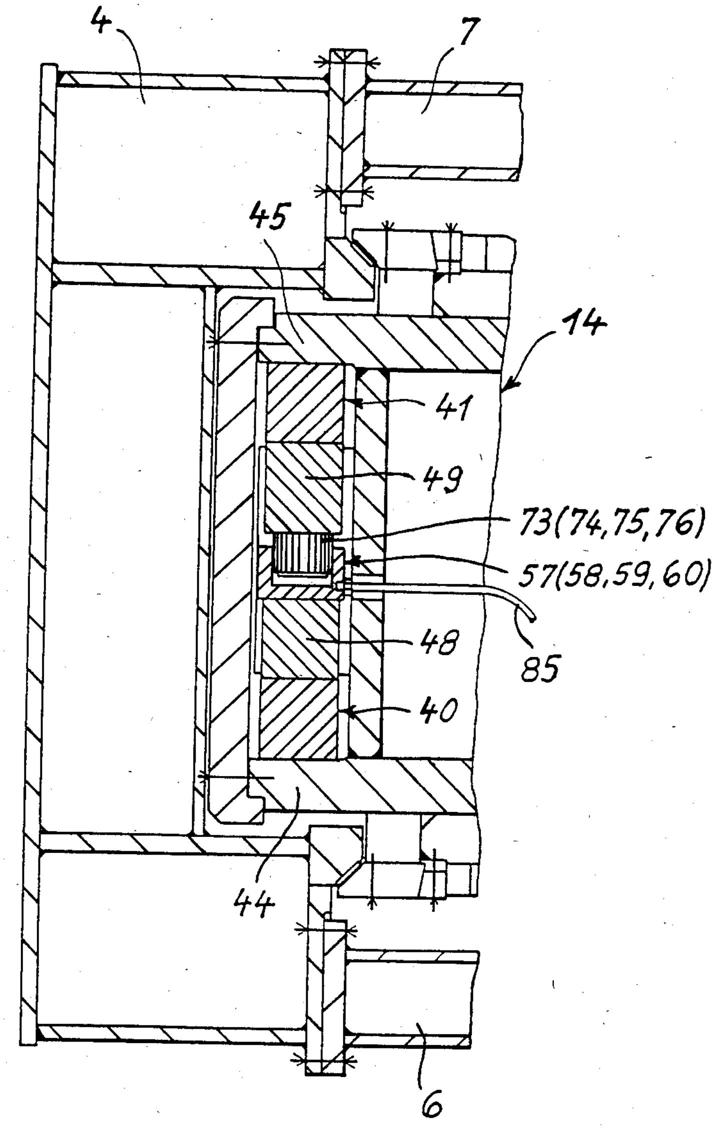
FIG. 3 is a partial sectional view in enlarged scale through the press taken on the line III—III of FIG. 1.
Figure 4:
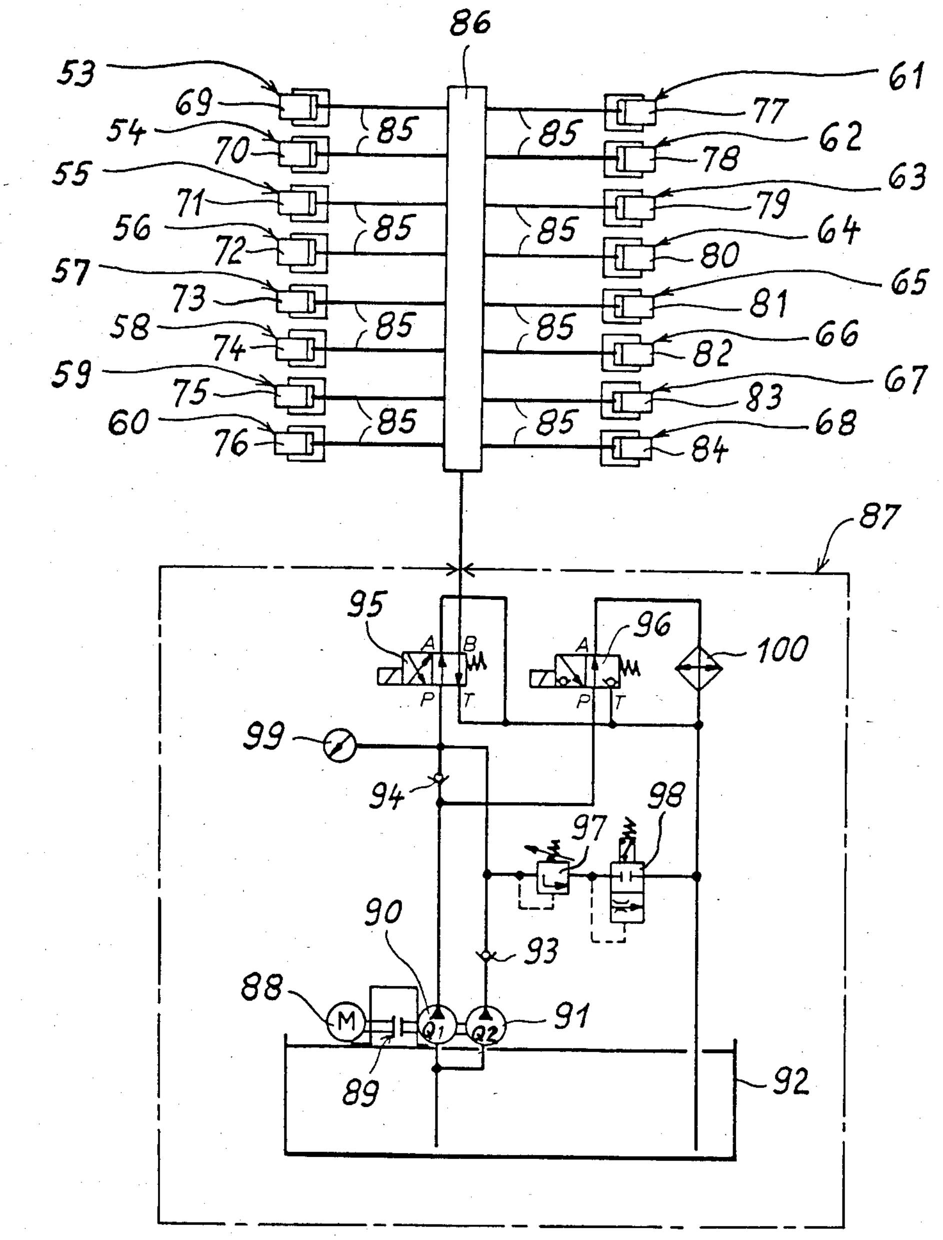
FIG. 4 is a portion of the hydraulic plan for the press of FIGS. 1 to 3.
Figure 5:
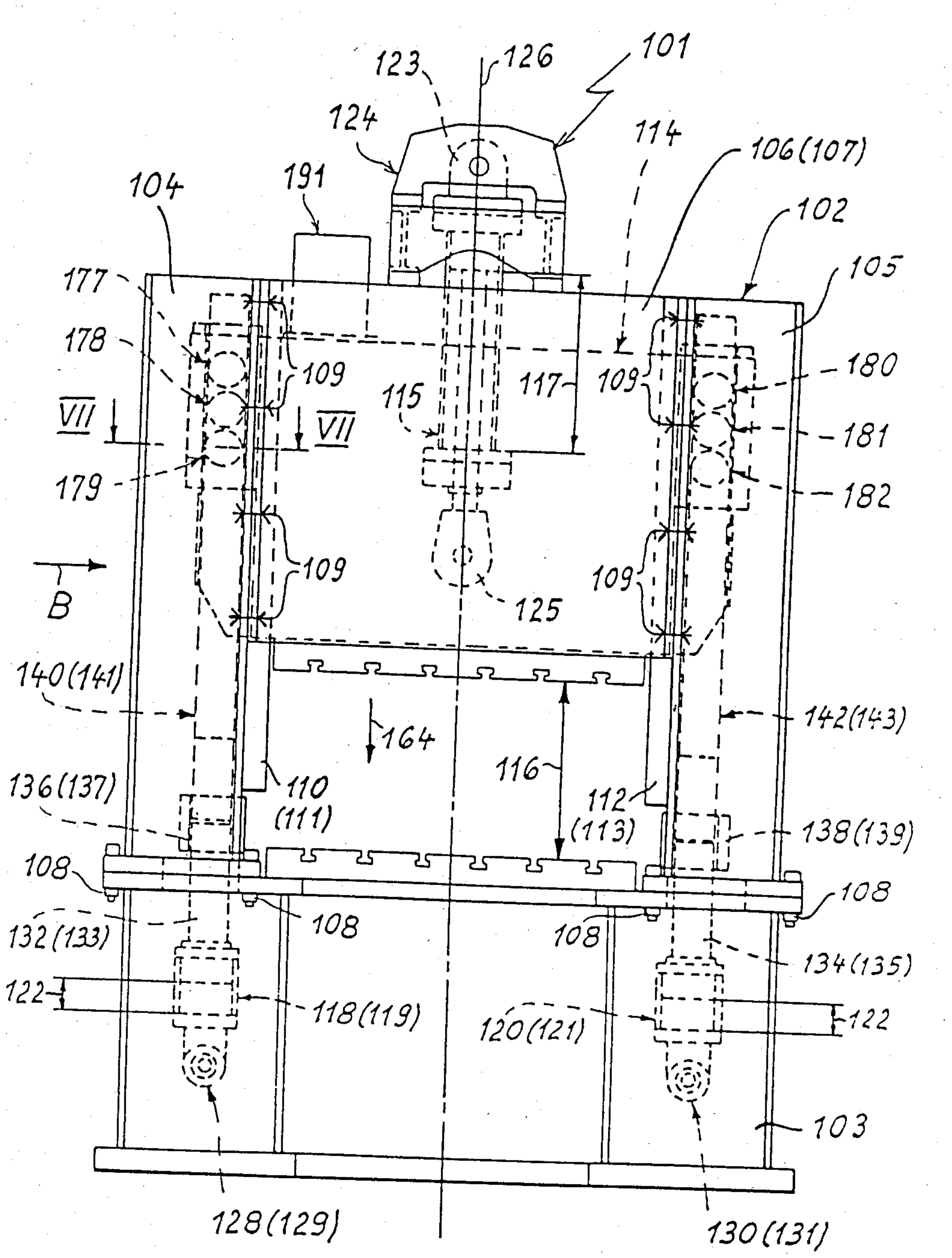
FIG. 5 is a front view of an hydraulic press comprising a second embodiment of the invention.
Figure 6:
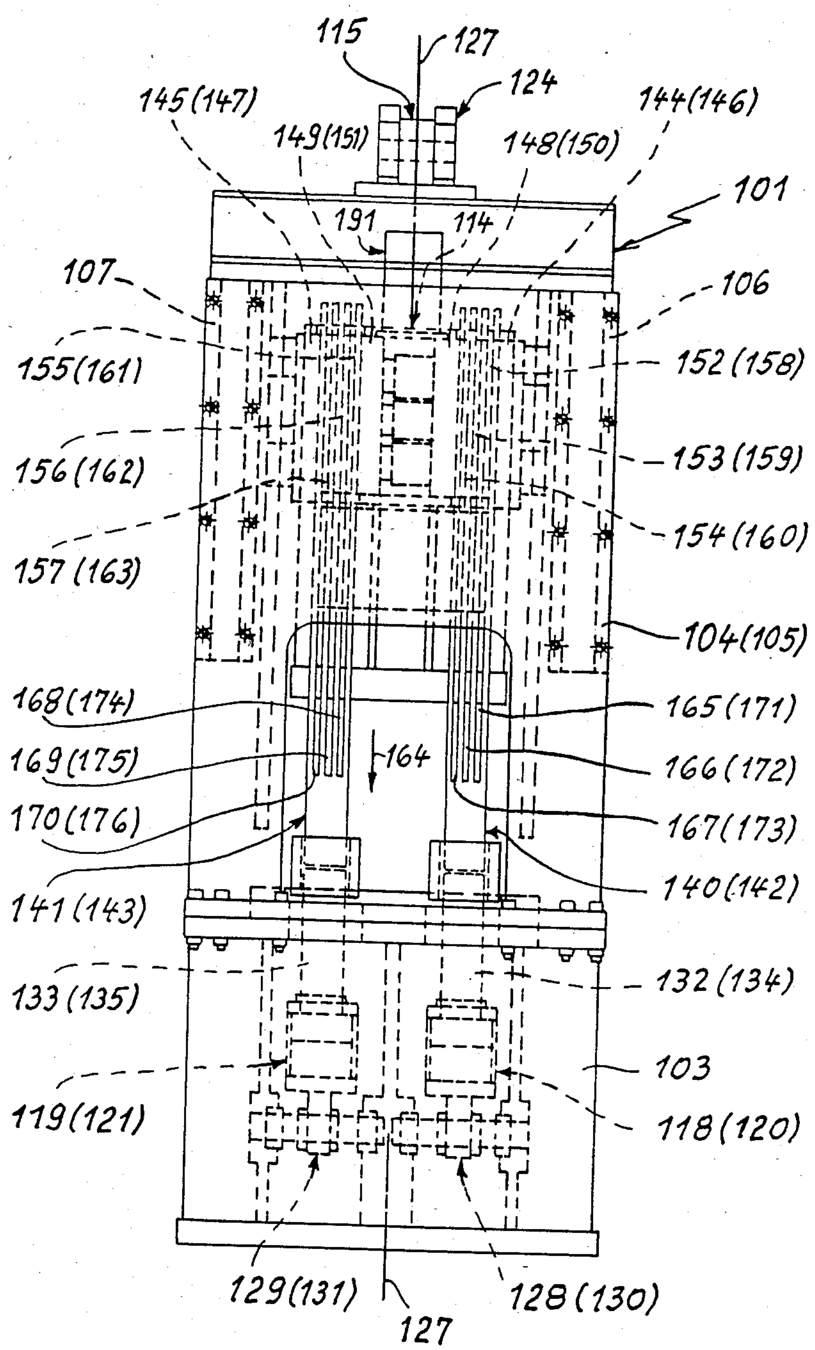
FIG. 6 is a side view of the press taken in the direction of the arrow B of FIG. 5.
Figure 7:
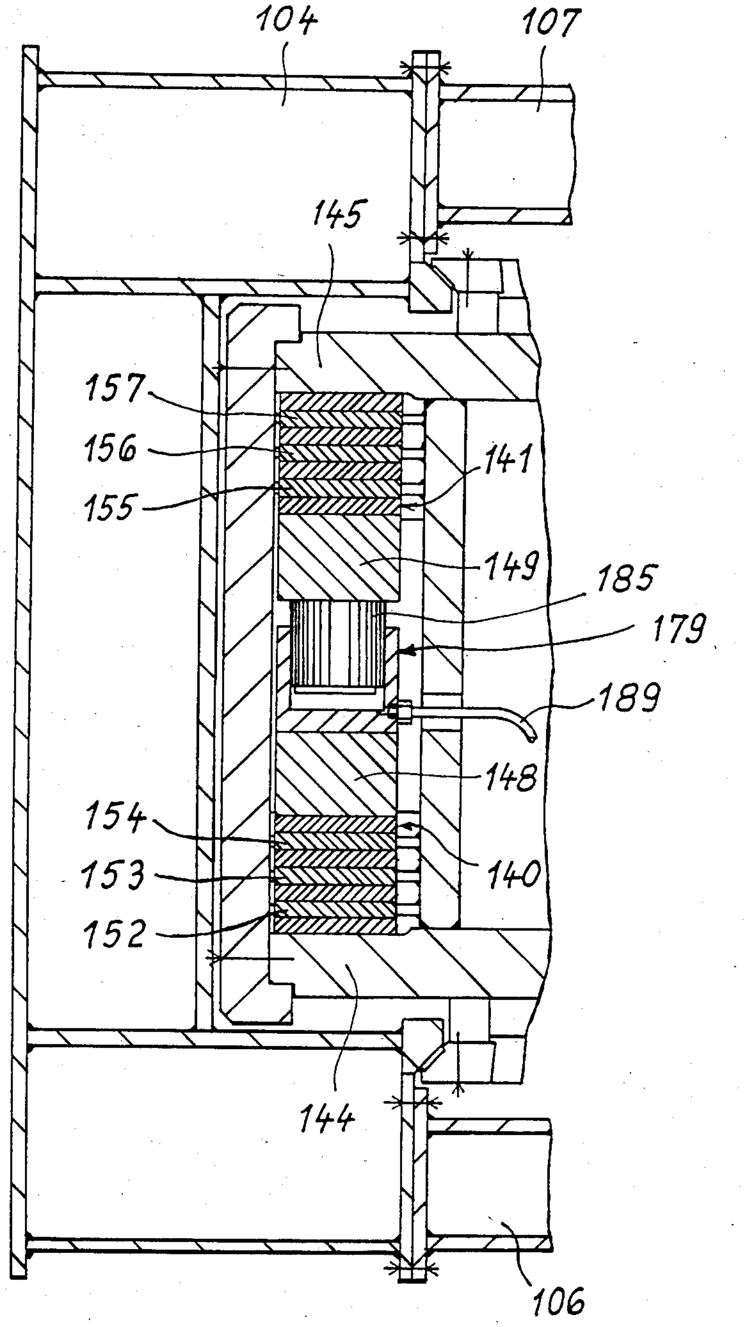
FIG. 7 is a partial sectional view in enlarged scale through the press taken on the line VII—VII of FIG. 5.
Figure 8:
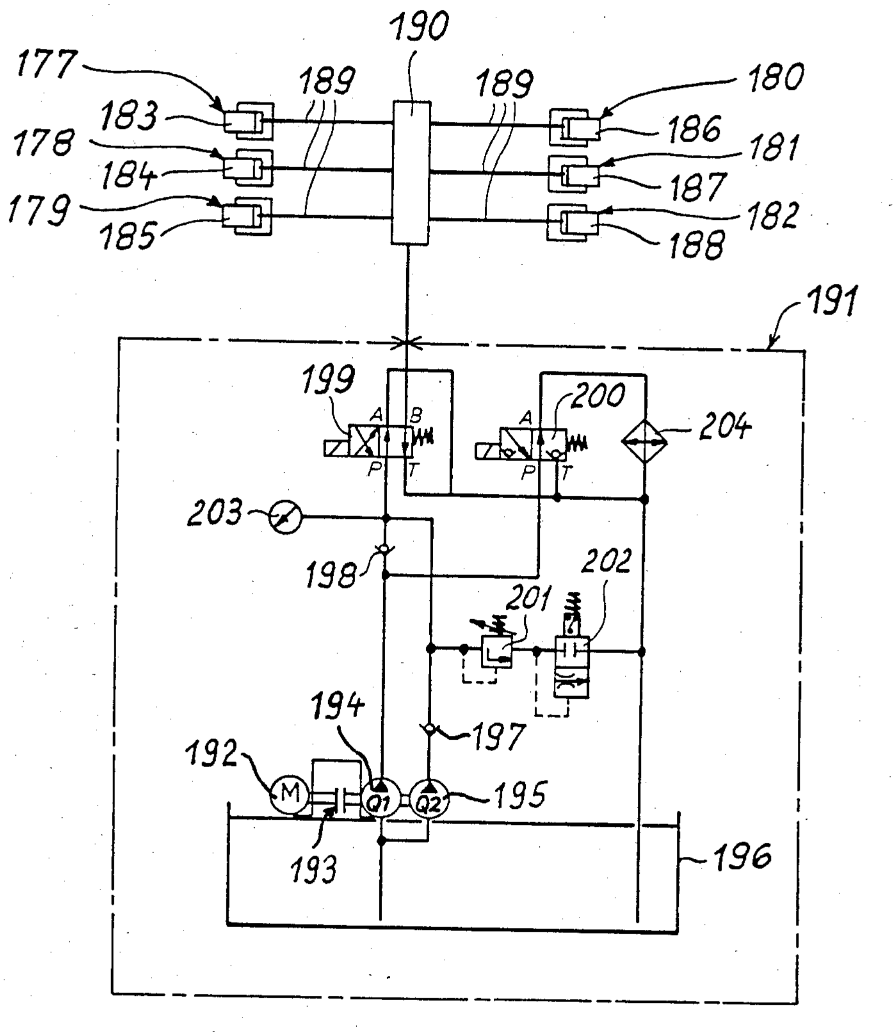
FIG. 8 is a portion of the hydraulic plan for the press of FIGS. 5 to 7.

An hydraulic press 1 includes a press frame 2 with a stationery cross-piece 3, two side parts 4, 5 and two cross-bars 6, 7. Screws 8, 9 connect the side parts 4, 5 with the stationery cross-piece 3 and with the cross-bars 6, 7.

The two side parts, 4, 5 each have two vertical guides 10, 11, 12, 13 for guiding a slidable cross-piece 14.

For driving the slidable cross-piece 14, there is provided an adjusting cylinder 15 with a stroke length 17 corresponding to the range of movement 16 of the press 1 and four press cylinders 18, 19, 20, 21, with short strokes 22, which are couplable with the slidable cross-piece 14.

The adjusting cylinder 15 is pivotably suspended at its upper end 23 from a bearing 24 resting on the cross-bars 6, 7. Its lower end 25 is pivotably connected to the slidable cross-piece 14.

The four press cylinders 18, 19, 20, 21 are arranged symmetrically to the middle 26, 27 of the press. Four links 28, 29, 30, 31 form the connection between the press cylinders 18, 19, 20, 21 and the stationery cross-piece 3.

Each press cylinder 18, 19, 20, 21 includes a piston rod 32, 33, 34, 35 which is connected to a coupling rod 40, 41, 42, 43 through a connecting sleeve 36, 37, 38, 39.

Each coupling rod 40, 41, 42, 43 is couplable to the slidable cross-piece 14 by means of a stationery clamping jaw 44, 45, 46, 47 and a pressable clamping jaw 48, 49, 50, 51.

The pressable clamping jaws 48, 49, 50, 51 are arranged for movement in the slidable cross-piece 14 perpendicular to the direction 52 of the press movement.

A pair of pressable clamping jaws 48, 49; 50, 51 cooperate with eight pressure cylinders 53, 54, 55, 56, 57, 58, 59; 60, 61, 62, 63, 64, 65, 66, 67, 68 located above one another. Each pressure cylinder 53 to 68 has a single acting piston 69, 70, 71, 72, 73, 74, 75, 76, 78, 79, 80, 81, 82, 83, 84.

All pressure cylinders 53 to 68, each of which is connected to a distributor 86 by means of the one conductor 85, are simultaneously supplied with pressure oil from an hydraulic unit 87.

The hydraulic unit 87 consists essentially of a motor 88, a coupling 89, two pumps 90, 91, an oil sump 92, six valves 93, 94, 95, 96, 97, 98, a pressure gauge 99 and an oil filter 100.

In the illustrated position of the two valves 95, 96 the pressure cylinders 53 to 68 are not supplied with pressure oil. The pressurizing movement of the pressure cylinders 53 to 68 is obtained by simultaneously switching the two valves 95, 96 and by turning on the motor 88.

SECOND EMBODIMENT

An hydraulic press 101 includes a press frame 102 with a stationery cross-piece 103, two side pieces 104, 105 and two cross-bars 106, 107. Screws 108, 109 connect the side pieces 104, 105 with the stationery cross-piece 103 and with the cross-bars 106, 107.

The two side pieces 104, 105 each have two vertical guides 110, 111, 112, 113 for guiding a slidable cross-piece 114.

For driving the slidable cross-piece 114 there is provided an adjusting cylinder 115 having a working stroke 116 corresponding to the range of movement 117 of the press 101 and four press cylinders 118, 119, 120, 121 of short stroke 122 couplable to the slidable cross-piece 114.

The adjusting cylinder 115 is pivotably suspended at its upper end 123 from a bearing 124 resting on the cross-bars 106, 107. Its lower end 125 is pivotably connected to the slidable cross-piece 114.

The four press cylinders 118, 119, 120, 121 are arranged symmetrically to the middle 126, 127 of the press. Four links 128, 129, 130, 131 form the connection between the press cylinders 118, 119, 120, 121 and the stationery cross-piece 103.

Each press cylinder 118, 119, 120, 121 contains a piston rod 132, 133, 134, 135 each of which is connected to a coupling rod 140, 141, 142, 143 through a connecting sleeve 136, 137, 138, 139.

Each coupling rod 140, 141, 142, 143 is couplable to the slidable cross-piece 114 through a stationery clamping jaw 144, 145, 146, 147, a pressable clamping jaw 148, 149, 150, 151 and three pressure plates 152, 153, 154, 155, 156, 157, 158, 159, 160, 161, 162, 163.

The pressable clamping jaws 148, 149, 150, 151 and the pressure plates 152 to 153 are arranged in the slidable cross-piece 114 for movement perpendicular to the direction 164 of press movement.

Each coupling rod 140, 141, 142, 143 has three longitudinal slots 165, 166, 167, 168, 169, 170, 171, 172, 173, 174, 175, 176 in each of which one of the pressure plates 152 to 163 is received.

Two pressable clamping jaws 148, 149; 150, 151 cooperate with three superimposed pressure cylinders 177, 178, 179, 180, 181, 182. Each pressure cylinder 177 to 182 has a single acting piston 183, 184, 185, 186, 187, 188.

All pressure cylinders 177 to 182, each of which is connected by a single conductor 189 to a distributor 190, are simultaneously supplied with pressure oil from an hydraulic unit 191.

The hydraulic unit 191 consists essentially of a motor 192, a coupling 193, two pumps 194, 195, an oil sump 196, six valves 197, 198, 199, 200, 201, 202, a pressure gauge 203 and an oil filter 204.

In the illustrated positions of the two valves 199, 200 the pressure cylinders 177, 182 are not connected with pressure oil.

The pressurizing movement of the pressure cylinders 177 to 192 is obtained by simultaneously switching the two valves 199, 200 and by turning on the motor 192.

We claim:

1. An hydraulic press, such as for pressing plastic mats reinforced with glass fibers into formed parts, with a stationery cross-piece and a slidable cross-piece as well as a press drive which drive for moving the slidable cross-carriage includes at least one adjusting cylinder with a working stroke corresponding to the range of movement of the press and at least two press cylinders of short stroke couplable to the slidable cross-piece through a coupling, characterized in that for coupling each press cylinder to the slidable cross-piece a coupling rod is provided along with at least one stationery clamping jaw and at least one pressable clamping jaw cooperating with the coupling rod.

2. An hydraulic press according to claim 1 further characterized in that between two pressable clamping jaws of two coupling rods several pressure cylinders are arranged above one another.

3. An hydraulic press according to claim 2 further characterized in that each pressure cylinder includes a single acting piston.

4. An hydraulic press according to claim 1 further characterized in that each pressable clamping jaw is movable perpendicular to the direction of the press stroke.

5. An hydraulic press according to claim 1 further characterized in that each coupling rod has at least one longitudinal slot, and that each longitudinal slot has associated with it at least one pressure plate.

6. An hydraulic press according to claim 5 further characterized in that each pressure plate is movable perpendicular to the direction of the movement of the press.

* * * * *